(12) United States Patent
Masurkar (10) Patent No.: US 7,685,430 B1
(45) Date of Patent: Mar. 23, 2010

(54) INITIAL PASSWORD SECURITY ACCENTUATED BY TRIPLE ENCRYPTION AND HASHED CACHE TABLE MANAGEMENT ON THE HOSTED SITE'S SERVER

(75) Inventor: Vijay B. Masurkar, Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1314 days.

(21) Appl. No.: 11/155,254

(22) Filed: Jun. 17, 2005

(51) Int. Cl.
*G06F 21/00* (2006.01)
*H04L 29/06* (2006.01)

(52) U.S. Cl. ................ 713/182; 713/150; 713/151; 726/4; 380/255

(58) Field of Classification Search .......... 713/151, 713/150, 182
See application file for complete search history.

(56) References Cited

U.S. PATENT DOCUMENTS

| | | | | |
|---|---|---|---|---|
| 5,497,421 | A * | 3/1996 | Kaufman et al. | 713/156 |
| 7,373,515 | B2 * | 5/2008 | Owen et al. | 713/182 |
| 2002/0159601 | A1 * | 10/2002 | Bushmitch et al. | 380/277 |
| 2002/0178366 | A1 * | 11/2002 | Ofir | 713/182 |
| 2003/0084292 | A1 * | 5/2003 | Pierce et al. | 713/168 |
| 2003/0229788 | A1 * | 12/2003 | Jakobsson et al. | 713/171 |
| 2004/0003246 | A1 * | 1/2004 | Hopkins et al. | 713/168 |
| 2004/0039905 | A1 * | 2/2004 | Leoutsarakos | 713/153 |
| 2004/0107282 | A1 * | 6/2004 | Chakraborty et al. | 709/229 |
| 2004/0151323 | A1 * | 8/2004 | Olkin et al. | 380/280 |
| 2004/0187018 | A1 * | 9/2004 | Owen et al. | 713/200 |
| 2004/0199774 | A1 * | 10/2004 | Zissimopoulos et al. | 713/179 |
| 2005/0036611 | A1 * | 2/2005 | Seaton et al. | 380/44 |
| 2005/0081044 | A1 * | 4/2005 | Giles et al. | 713/182 |
| 2005/0216767 | A1 * | 9/2005 | Mitsuoka et al. | 713/201 |
| 2005/0223233 | A1 * | 10/2005 | Ishidera | 713/185 |

OTHER PUBLICATIONS

Kaletka, Mark O., Easy things users can do to improve security: Recommendations of "best practices" for securing individual user's accounts,http://security.fnal.gov/UserGuide/password.htm, Aug. 14, 1998, pp. 2.

(Continued)

*Primary Examiner*—Emmanuel L Moise
*Assistant Examiner*—Luu Pham
(74) *Attorney, Agent, or Firm*—Marsh Fischmann & Breyfogle LLP; Jonathon A. Szumny; Kent A. Lembke (57) ABSTRACT

A method for remote services authentication in an internet hosted environment includes a high level process and functionality for a secure, practical and logically optimized inter-network authentication mechanism by employees, partners and customers of an enterprise into the hosted Internet site. The lightweight authentication and authorization mechanism can be most effectively implemented in Java as part of the application or web server servlet. The method for remote services authentication includes initial secure password establishment, subsequent authentication and authorization, as well as authentication and authorization upon resuming previously run sessions with the hosted server using Internet cookies.

19 Claims, 5 Drawing Sheets

OTHER PUBLICATIONS

Shamir, Adi, How to Share a Secret, Massachusetts Institute of Technology, http://szabo.best.vwh.net/secret.html, Sep. 1979, pp. 1-4.

OASIS Extensible Access Control Markup Language (XACML), version 2. http://www.oasis-open.org/specs/index.php#xacmlv2.0, Feb. 1, 2005, pp. 1-141.

Park, Joon S., Sandhu, Ravi, Secure Cookies on the Web, IEEE Internet Computing, Jul.-Aug. 2000, pp. 36-44.

Park, Joon S., Sandhu, Ravi, Ghanta. Sreelatha, RBAC on the Web by Secure Cookies, Proc. 13th IFIP WG11.3 Conf. Database Security, 1999. pp. 14.

* cited by examiner

INITIAL PASSWORD SECURITY ACCENTUATED BY TRIPLE ENCRYPTION AND HASHED CACHE TABLE MANAGEMENT ON THE HOSTED SITE'S SERVER

RELATED APPLICATIONS

The present invention is related to my co-pending U.S. patent application Ser. No. 11/155,063, filed on Jun. 17, 2005 entitled "Role-based Access Using Combinatorial Inheritance and Randomized conjugates in an Internet Hosted Environment" and to my co-pending U.S. patent application Ser. No. 11/155,235, filed on Jun. 17, 2005 entitled "Methods and Apparatus for Persistence of Authentication and Authorization for a Multi-Tenant Internet Hosted Site Using Cookies."

BACKGROUND OF THE INVENTION

1. Field of the Invention

The present invention relates to authentication and access management, in general, which combines processes, technologies and policies to manage digital identities and specify how they are used to access resources. More specifically, the methods and apparatus are related to authentication into Internet hosted environments via remote login. They involve an enterprise, i.e. the owner of the hosted site (or operations center), an enterprise's customers' mission-critical web applications or services hosted into the site, and partner companies working with the enterprise in the hosted environment delivering services to the customers. The customers may have end users logging into the site along with the customer, partner and enterprise's employees.

2. Relevant Background of the Invention

Authentication is any process by which the identity of someone is claiming that identity is verified. This usually involves a username and a password. However, it can also include any other method of demonstrating identity, such as a smart card, a retinal scan, voice recognition, or fingerprints. Authentication is equivalent to showing a drivers license at the ticket counter at the airport. Authorization is finding out if the person, once identified, is permitted to use a particular resource. This is usually determined by finding out if that person is a part of a previously established group with pre-defined characteristics, or has a particular level in the pre-defined set of security privileges. Finally, access control is a much more general way of defining the controlled access to a resource. Access can be granted or denied based on a wide variety of criteria such as the network address of the client, the time of day, the browser which the visitor is using, and the like. Access control is controlling a user's reach to a desired resource by some arbitrary condition which may or may not have anything to do with the attributes of that particular user.

Because these three techniques are so closely related, generally, in most real applications, it is difficult to analyze them separately from one another. In particular, in most of the real-world implementations, authentication and authorization are inextricably linked.

Basic authentication, which involves sending client-browser-stored passwords to a server over the Internet, and digest authentication, which implies sending digests of the passwords (such as MD5) to a server over the public wire, both suffer from the same major flaw. The password or its digest traversal may happen over an SSL (Secure Socket Layer) protocol. There are also temporary passwords sent for initial login (usually by email) "in the clear" or over unsecured networks. Encrypted or not, smart hackers can figure out how to use the password and/or the alongside content information traveling over the Internet. Secondly, text files are used to store authentication information. The problem with this technique is the burden of looking something up in a text file that has no index. Every user request needs to go through this time-costly operation. Since HTTP is stateless, authentication has to be verified every time that content is requested. This can be prohibitively slow, particularly for large numbers of users. In many cases, a valid username/password is rejected because the authentication module just had to spend so much time looking for the username in the file that the server timed out and returned a failed authentication. So, typically, an alternative is to use some variety of databases which are optimized for looking for a particular piece of information in a very large data set. The database builds indices in order to rapidly locate a particular record, and has query languages for swiftly locating records that match a particular criteria. There are numerous modules available for servers to authenticate using a variety of different databases. On a large scale, in the United States, there is for example, National Science Foundation's (NSF) "Participants for Advanced Computational Infrastructure", or PACI.

The focus of the present invention, however, is on small to medium sized, cost-effective Internet hosted shared environments; the types used by Application Service Providers (ASPs) where employees, customers and partners work together to provide and access business services based on Internet-based applications.

The economies of scale have driven computing platform vendors to develop products with very generalized capabilities. As a result, these products can be utilized in a wide variety of ways to accomplish a given set of business goals. These products possess varying ranges of privileges to operate on the resources in a given environment making the environment complex in terms of security and privacy. Secondly, most authentication mechanisms end up being cumbersome in the process of designing them to be highly secure. Some have easy-to-use but weak authentication and some employ overly complicated multiple login steps or packaged solutions that may have customization and administrative overhead. When employees as well as business partners and/or customers of an enterprise share a common business system for use, it becomes necessary to develop an overall authentication mechanism that is not only secure to protect the interests of the business entities, but also very friendly and easy to use and maintain. In addition, role-based access control helps to define authorization using people's roles and their functional characteristics in the operational environment of the hosted site. Access is the ability to do something with a computer resource (e.g., use, change, or view). Access control is the means by which the ability is explicitly enabled or restricted in some way (usually through physical and system-based controls). Computer-based access controls can prescribe not only who or what process may have access to a specific system resource, but also the type of access that is permitted. These controls may be implemented in the computer system, in external devices or software artifacts.

Figure 1:
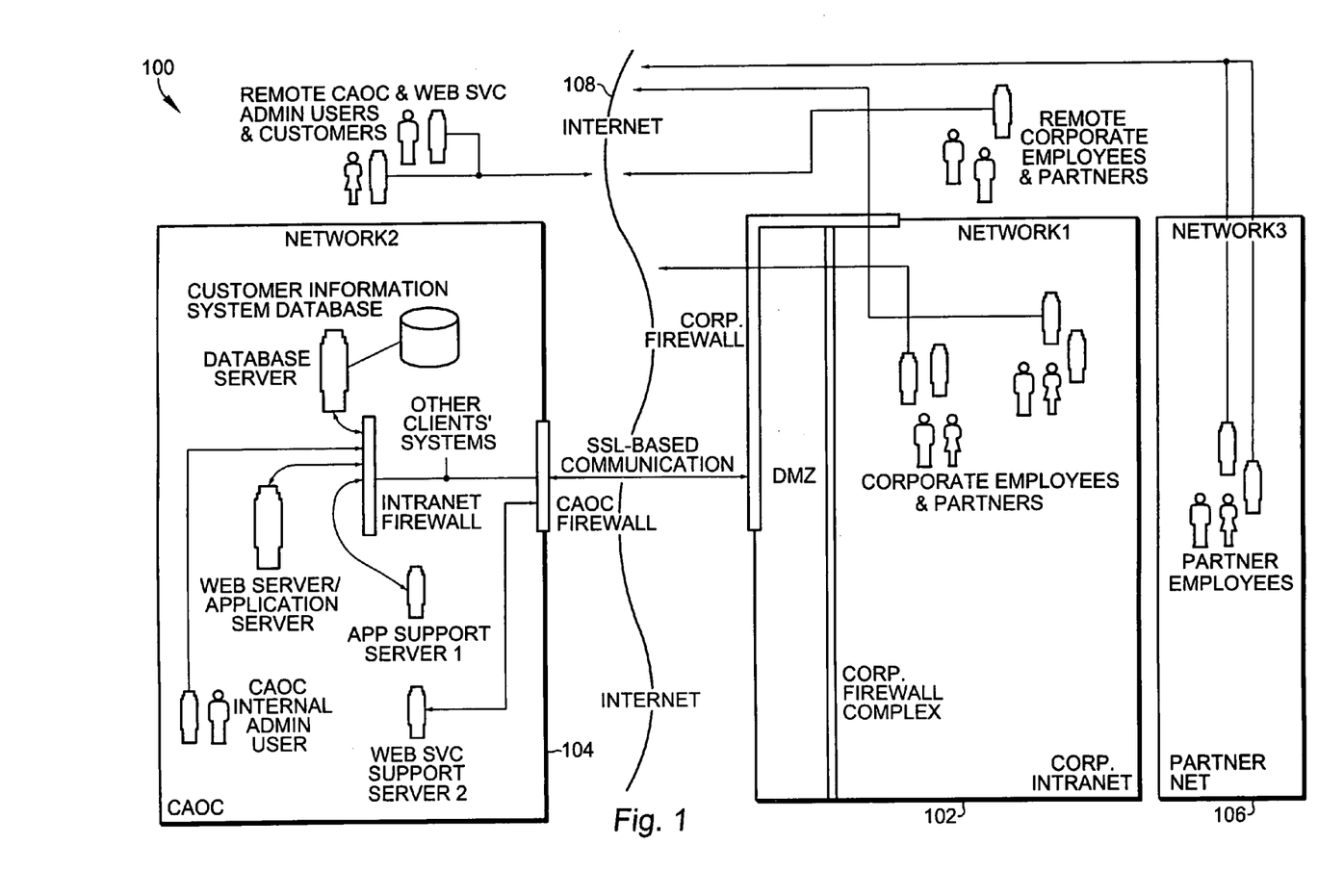
FIG. 1 is an overview of the enterprise, partner and customer user communications with the CAOC, Customer Applications Operations Center.

As shown below in FIG. 1, the context and background of the present invention includes primarily five types of internetworked environments on the Internet: an Enterprise's corporate intranet—"Network1" 102; a Web Service provider network for customer's application hosting in the Customer Application Operations Center ("CAOC") by the enterprise—"Network2" 104; an Enterprise's (Business) Partner Network—"Network3" 106; an Enterprise's Customer Network—not explicitly shown in FIG. 1; and the Internet 108. All communication from network 102 and network 106 to network 104 is via SSL over the Internet 108. There are also remote enterprise, partner and customer users, along with CAOC administrators communicating with the CAOC over the Internet 108.

The customer's web service or application resides at the enterprise's CAOC site. The primary components of the system are the web application, the application server which hosts the application and web server on the same or a different host as the application's host, the database server (where the passwords are stored) and two supporting application servers for data and system management and administration.

Enterprise employees, customers and partners as users of the web application log into the application over Secure Socket Layer (SSL) protocol (using browsers supporting SSL 3.0 or higher) from an enterprise's, partner's or customer's corporate network, or from the Internet. The user's ID's and passwords traverse the networks in encrypted form. The users of the service are the customers and their end users who subscribe to the application, but note that overall users includes employees of all tenant companies, partners and customers, as well as those of the enterprise. Administrators of the hosted site are either the enterprise or the partner employees, and follow the rules for employees and partners respectively. The partner users login from within their network, Network3, or from the Internet, as shown above. Similarly, customers login from their corporate networks or from the Internet.

While prior art techniques provide various authentication and authorization mechanisms, they do not always provide a secure lightweight technique combining strong authentication and role-based authorization in a user-friendly way using a user's safer intranet LAN entities and non-persistent yet secure browser client cache as described below for a CAOC type shared hosted site. What is desired is a technique that has strong security yet alleviates complexity and overhead for the user when initially logging, transparently re-logging and being authenticated and authorized, and diagnosing failures and security compromises automatically across the intranet.

SUMMARY OF THE INVENTION

The present invention provides a high level process and functionality for a secure, practical and logically optimized, yet friendly, inter-network authentication mechanism by employees, partners and customers of an enterprise into the hosted Internet site. Assuming the absence of packaged solutions from several vendors, the lightweight authentication and authorization mechanism can be most effectively implemented in Java as part of the application or web server servlet.

In summary, it includes initial secure password establishment via specific methods and apparatus, and subsequent authentication and authorization mechanisms, as well as authentication and authorization upon resuming previously run sessions with the hosted server using Internet cookies.

DETAILED DESCRIPTION OF THE PREFERRED EMBODIMENTS

A Business Unit ID ("BUID") of the CAOC user is used in several methods and apparatus as is described with respect to an embodiment of the present invention. In the present specification it is assumed that the BUID is known to the hosted site's login server as well as to the client machines since they are connected to their respective (hosted site's tenant and enterprise) networks. A BUID is a 32-character string consisting of three parts; a 16-character random string Company ID ("COID") that is a random ID for the user's business entity (company) following any secure password grammar rules, alphanumeric ID for his/her division which is a pre-assigned four-character string, and a random twelve-character filler string, RF (again following any secure password grammar rules).

{<Company_ID_Random_String>|<Company_Division_ID>|<Random_Filler_String>}

In the present invention it is assumed that BUIDs are regenerated periodically during the CAOC maintenance downtime. This minimizes the possibility that eavesdroppers and hacker crypto-analysts will reverse engineer data, algorithms and protocols used by deciphering BUIDS. If/when new BUIDs are generated in this way, the server ensures that previously generated and utilized BUIDs are not in core memory, cache, persistent storage, swap memory, or the like. Copies of BUIDs may remain in the backup media, but the possibility that a miscreant can recover those copies (violating physical security) is disregarded in this context. All CAOC participating tenants (customer and partners) and the hosting enterprise must synchronize the BUID regeneration. This is a one-time database setup in a pre-designated period, and can be done automatically without much overhead during the hosted site's periodic downtime.

The following are the notations used in the present specification.

Hash operation: <algorithm_used>(key, <input_character_string>). For example, if it is SHA-256 used for generating a hash, then the following:

SHA-256(xyz, abcdef12345)

Encryption: <algorithm_used>(E){key, <input_character_string>}. For example, if AES is utilized for encrypting, then:

AES(E){xyz, abcdef12345}

Decryption: <algorithm_used>(D){key, <input_cipher_text>). For example, if AES decryption is performed with the same above key, xyz, and the cipher text from the above encryption was 6789ghijk, then it is represented as this:

AES(D){xyz, 6789ghijk}

Signing of a character string using AES will be documented in this way:

AES[<signer's_private_key>, <input>]

Concatenation of strings, string1 and string2, will be represented this way:

{<string1>|<string2>}

A first embodiment of the invention concerns initial password security accentuated by triple encryption and hashed cache table management on the hosted site's server.

A hosted customer in the CAOC has end users who log into the CAOC to use the web service or application. It is assumed that customer's user's IDs (and customer's employees' IDs, if the customer so desires) are entered initially by automated loading means by an administrative facility. This administrative facility is part of a client-server application intended for the enterprise's administrators to set up the CAOC for all the hosted customers as well as partners and enterprise employees.

Initially, sixteen-character passwords for all users are set to randomly generated passwords in the central user password database with no time expiry. The result is that each password is different from the rest and is not known to anyone. The algorithm for construction of this random password uses a set of any popular (highly secure) password construction criteria referred below as "initial password grammar construction guidelines". There are many sources of information on this topic.

Since users perform initial logins at different times, it is unpredictable as to how much time elapses before the algorithm is used. In order to minimize the risk arising out of this vulnerability, the unused random passwords are continuously and automatically regenerated and reset to different values every twenty four hours.

The above algorithm (and a set of multiple algorithms used) for generating the random password is never disclosed to anyone or is never predictably utilized again unless under unusual circumstances such as recovering the entire system from total damage. If a reset of the entire database is needed at any time, another algorithm (or an arbitrary combination of other algorithms) are preferred to perform resets of all passwords. The usage of another algorithm prevents any possibility of a priori knowledge of the intricacies of the deployed random password creation algorithm.

There are primarily two parts described herein for secure first login using an initial password generated by the hosted server. The first part refers to "randomization accentuated by triply-sequenced encryption for remote client initial passwords" and explains a method to generate, transport and use a temporary password securely. The second part refers to a "hashed and monitored temporary password cache table on the hosted site's server for initial login" and describes generation, usage and maintenance of a trusted temporary password caching mechanism on the hosted site.

The following description refers to the randomization accentuated by triply-sequenced encryption for remote client initial passwords.

The use of passwords is a major point of vulnerability in computer security in spite of its global use as a means for authentication, as passwords are often easy to guess by automated programs such as those for running dictionary attacks. Also, temporary passwords, particularly for first time logins, remain very widely used initial authentication method despite their well-known security weaknesses such as sending them over email, transporting in the clear over the public wires and leaving them unprotected for certain periods or indefinitely on client machines. Most of the current methods and apparatus are prone to stealing passwords from personal computers, eavesdropping or advanced dictionary attacks. Thus, initial user authentication clearly remains a practical problem to solve. From the perspective of a service provider this problem needs to be solved within the real-world constraints faced such as the available hardware/software infrastructures and login performance.

The following description relates to the generation and transport of initial passwords.

During the first login at the Internet hosted site that is shared by enterprise employees, customers and partners, a user is requested to enter his or her user ID, userID, and his or her business unit ID, BUID (which is automatically retrieved by the client login process from the user's intranet LAN), and press the "New User" button.

Figure 2:
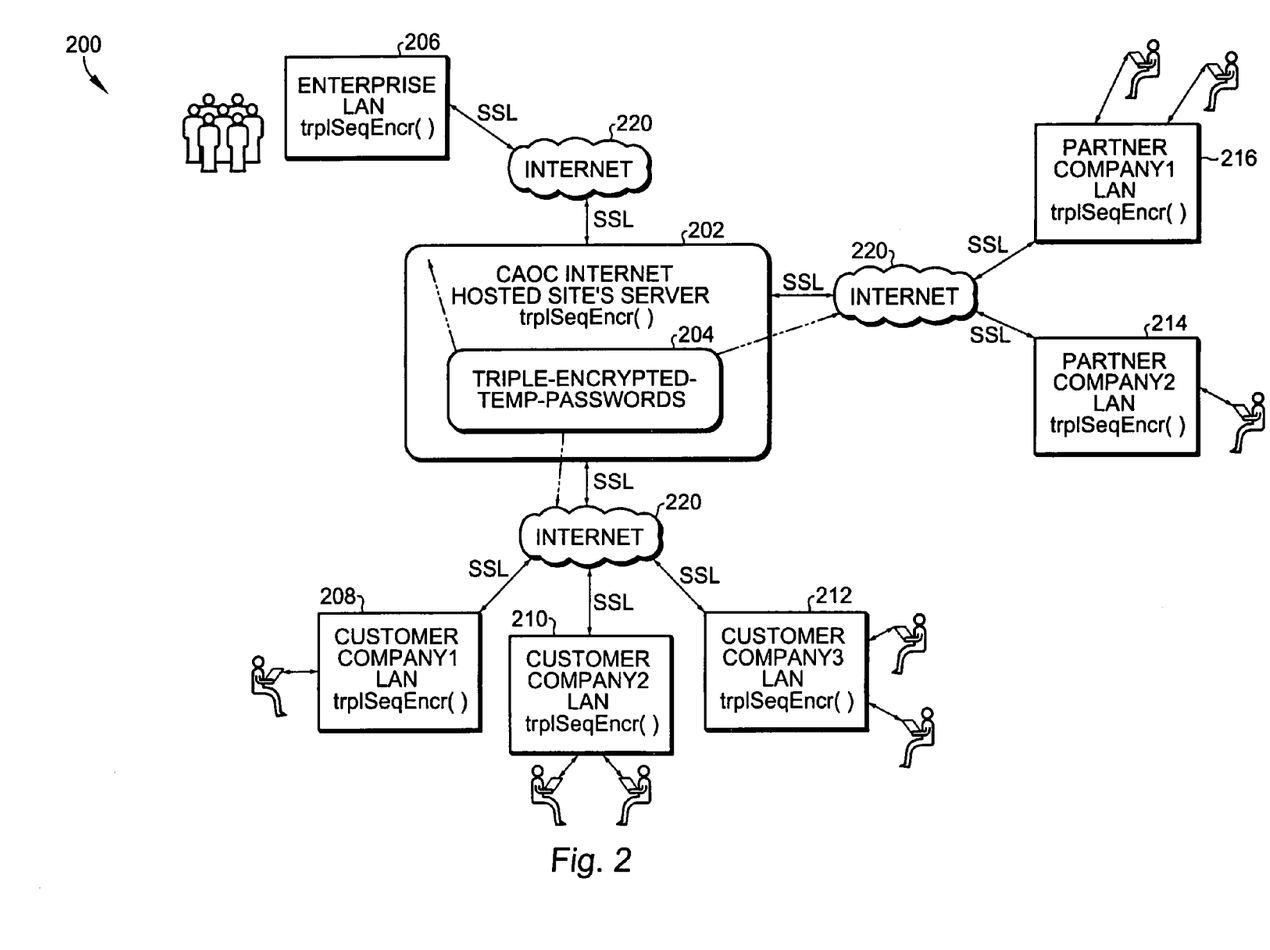
FIG. 2 depicts how an enterprise's LAN, partner companies' LANs, and customer companies' LANs communicate with the CAOC for temporary password login according to an embodiment of the present invention.

It is assumed that the hosted server and all clients (enterprise employees, partners and customers) can access a utility over SSL, named here as "trplSeqEncrypt", via its own company LAN access as shown below in FIG. 2. FIG. 2 depicts how enterprise's LAN 206, partner companies' LANs 214 and 216, and customer companies' LANs 208, 210 and 212 receive encrypted temporary passwords 204 from the CAOC Internet Hosted Site's server 202 via the SSL protocol over the Internet 220.

The hosted server first generates a random initial (temporary) password for the first login with the time expiry set. The temporary password is triply and sequentially encrypted employing "AES"—the Advanced Encryption Standard (FIPS-197) using a sequential cryptography algorithm (which is already incorporated into some commercial products such as the Java 2 SDK, Standard Edition, v1.4 onwards in the "JCE", Java Cryptography Extension). The randomization is accentuated by triple encryption to protect the temporary password that is transported to the users of the respective tenant companies of the CAOC as well as those of the enterprise.

There are certain assumptions made for the conditions under which the deployment of such a mechanism will take place.

Generally, there are two types of attacks on the LANS; eavesdropping and imposter attacks. SSL protects from compromise by the former. In an imposter attack, an intruder can make one host look like a "trusted" one, yet may have planted malware on it (e.g. replacing trplSeqEncr( ) with a trojan horse). Thus the LAN can result in a cascading loss of trust. But, it is assumed here that proper security measures are taken to protect the LANs of the tenant companies.

There is a basic trust in the private/public key pair generated by each of the user's browsers, referred to here as "client" or "client machine". The transport of a public key to the hosted site's server is carried out via standard industry protocols (such as SSL) utilizing certificates or any other comparable mechanism.

If certificates are used, then the server trusts the set of Certificate Authorities deployed for this mechanism on behalf of the CAOC tenants and the enterprise.

The process of triple encryption on the hosted server side and decryption on the user's side can be automated for speed, so users don't need to be aware of the algorithmic steps, and complex password and intermediate strings to be processed.

The time spent on triple encryption and subsequent decryption for every initial (temporary) password is negligible compared to the time of its maximum time of existence in the user's client machine, which is twenty four hours.

Since BUID changes periodically, the breaking of the encryption process is made harder even if the client's private/public key pair is discretely stolen. On the other hand, if BUID is stolen, the user's private key of his/her client machine is assumed to have remained private. Stealing of both, the key pair and the BUID, is considered a rare circumstance.

All intermediate results of the process are destroyed after completion of triple encryption (for each initial temporary password) by the server before sending it to the client, and, also, after decryption of temporary password by the client.

Using the userID as a key and verifying the entered BUID against the user database, the hosted server extracts from the password database the sixteen-character random password, randomTempPasswd, generated earlier using the above-mentioned "initial password grammar construction guidelines".

The process of (a) triple encryption by the server and (b) an encryption step followed by double decryption by the client is described in detail below.

The sequential triple AES encryption by the hosted site's (CAOC) server is as follows:

In a first step, the user's client system's domain name, DomainName, is AES encrypted with BUID as a key:
AES(E){BUID, clientDomainName}
Let us name the resultant ciphertext string as "X".

In a second step, the key to encrypt is the value obtained by AES encrypting the user's client system's domain name:
AES(E){X, randomTempPasswd}
Let us name the resultant string as "Y".

In a third step, the "Y" string is AES encrypted using user's client machine's public key clientPub:
AES(E){clientPub, Y}
Let us name the resultant ciphertext string as "Z". (Note: Z can only be decrypted by the owner of the user client's private key, i.e. "clientPriv".)

In a fourth step, the resultant string "Z" is sent to the users by email. At the same instance, the server starts the twenty-four-hour-clock for the password and puts it in the temporary password cache table (which is described in detail below).

The initial and subsequent login procedure is described below.

The user, at the time of login (which must be within twenty four hours of the temporary password sending), invokes the utility "trplSeqEncrypt" via its own corporate environment (enterprise, partner or customer corporate LAN) to perform the following steps.

In a first step, AES encrypt the user's client machine's clientDomainName using user's BUID as a key.
AES(E){BUID, clientDomainName}
This is the resultant ciphertext string denoted as "X".

In a second step, AES decrypt Z (that was sent by the server) using user's client machine's private key to get Y.
AES(D){clientPriv, Z}
The resultant ciphertext string will be Y.

In a third step, decrypt Y using X as the AES decryption key, both obtained from the above two operations.
AES(D){X, Y}
The resultant string is the temporary password, randomTempPasswd, generated by the server and sent to this client.

After this process is successfully completed, all the intermediate results are destroyed by the client-side running trplSeqEncrypt( ). The user then copies the password string presented on the screen into the hosted site's login screen's password field in order to login for the first time.

When the user enters this password, he or she is forced to change that password to one of his or her own choice (again following the "initial password grammar construction guidelines" described above).

In addition, this user must enter the BUID (that was entered earlier) so that the user's role profile can be created, initialized and loaded at the hosted site. Both of these criteria must be met before the user is allowed into the system. Since between the user-chosen password and the BUID there are three random strings constituting as many as (maximally possible) forty-four random characters, this combination is much harder to break for advanced dictionary attackers within a given limited timeframe.

The hashed and monitored temporary password cache table on the hosted site's server for initial login is now described.

A Java servlet thread is created in the front-end of the users' web service or application that continually runs in the background and checks the timestamps on the temporary passwords. This thread runs behind the main web application servlet and is started when the website is first loaded after the website-resident Java servlet manager has been started. Once every five minutes, the code checks to see if there are any new users on the password cache.

Generally, cache memory helps a CPU get its job done faster by storing needed data closer—in both time and distance—to where it's needed. Memory caches have dynamic information stored for immediate use. For speed, most cache systems maintain information in it in the clear. However, that can create a security hazard when/if the system is compromised. Here, in this mechanism, a single temporary password data record can stay in the cache for as long as twenty four hours, hence a more secure mechanism needs to be devised. AES, or Advanced Encryption Standard, is utilized for protecting the privacy and confidentiality of the temporary password data and SHA-256, Secure Hash Algorithm, for computing hashes to assert integrity.

Figure 3:
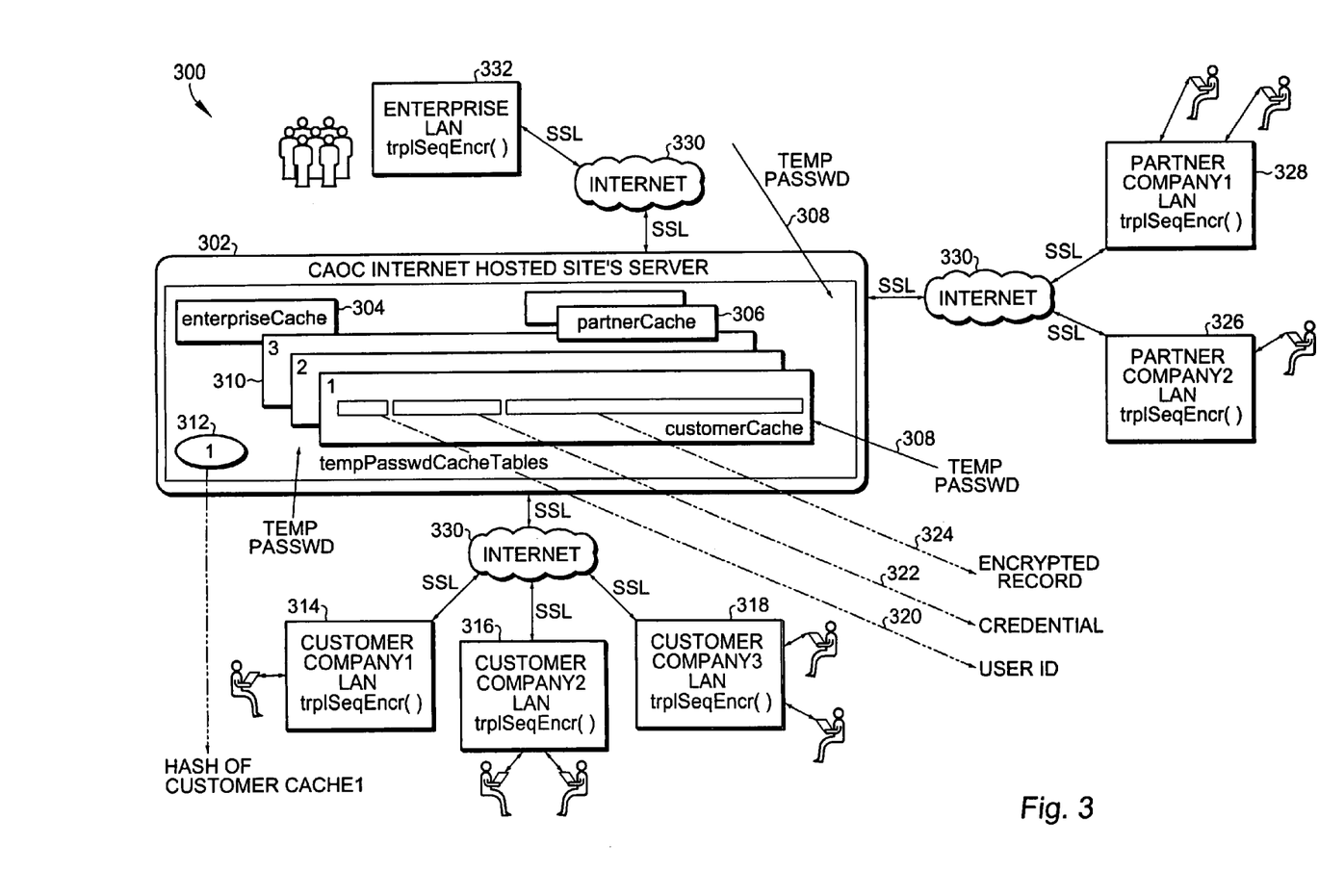
FIG. 3 shows the internal implications of logging into the CAOC Internet Hosted Site's server with a temporary password via SSL across the Internet according to an embodiment of the present invention.

Referring now to the environment 300 of FIG. 3, Enterprise LANs 332, Partner Company LANs 326 and 328, and customer company LANs 314, 316 and 318 have the trplSeqEncr( ) utility pre-installed that is utilized to encrypt and decrypt the temporary password 308. CAOC 25 server 302 maintains the temporary password cache tables 310 for enterprise, partners and customers. A single cache table record consists of userID 320, credential 322 and the entire encrypted record 324 generated as a result of logging in with the temporary password 308 by a single user.

The server is assumed to have a set of public and private keys generated under a trust of a well-known certificate authority ("CA"). Since the server's public key (serverPub) is used as a key for encryption of each of the temporary password records, the server's private key (serverPriv) is the only one that can be used for decryption when needed. So, after the server's creation of the assigned temporary password (to be sent to the client) and its associated record, each password entry (record) in the password cache table is AES-encrypted with serverPub (as the key) for privacy and confidentiality, except that for two fields in the record, userID and timeStamp, there are duplicate values maintained in clear.

The temporary password cache is now described.

The users of the cache are the ones who have been assigned temporary passwords. If they exist, the code then checks to see if the temporary password is more than twenty four hours old. If it is so, then the user is removed deleting the associated record from the cache table and the account is locked out. If the time elapsed is not more than twenty four hours since the temporary password was created, the user remains on the password cache. This mechanism prevents any valid user or a miscreant from attempting to log in (knowingly or unknowingly) with an expired temporary password.

Firstly, the userID is maintained in the clear as a key for record traversal. Secondly, since the userID and randomTempPasswd are utilized in combination for lookup and twenty-four-hour-time-check respectively, both must be protected. So, a copy of the values of the two fields together (userID+randomTempPasswd) are hashed by SHA-256 (Secure Hash Algorithm) using the user's BUID as the key. Mathematically, this credential is represented thus: {SHA-256 (BUID, (userID+randomTempPasswd)}. So, this "credential" is maintained outside of the ciphertext created for the entire record. Before traversing the records, the result of {SHA-256 (BUID, (userID+randomTempPasswd))} is verified against the earlier saved SHA-256 hash of the combined field values before using them as a lookup key and a predicate for authentication respectively.

At the time when the cache record is created, using a separate thread of the Java servlet, cacheRecordIntegrityCheck( ), every record's message digest is created using SHA-256 (which is a copy of the record in the cache) and, along with it, the associated time of creation of this digest is stored in a persistent manner (if needed for future use such as for diagnostic purposes). The key to the record is the userID field. The file with such digest records (with their associated userIDs and timestamps) is encrypted by the server's public key, serverPub. So, only its private key, serverPriv, can decrypt this file.

The records in the cache table are checked by cacheRecordIntegrityCheck( ) for integrity violation every five minutes by verifying against the persistently stored digest records (from five minutes earlier). Any violation of integrity is reported by the servlet thread via automated means to the system administrator. At the cache integrity verification time, the server decrypts the digest file. Next, the newer set of records in the cache, along with the records that were created for the earlier server sent passwords (i.e. prior to the last five minutes) are compared for integrity.

The larger message digests created by SHA-256 (compared to other digest algorithms) makes it more secure against (a) brute-force collision and (b) inversion attacks. Every business entity, enterprise, customer company or partner company, has an associated hashed table with userID as the lookup value for their every temporary password record. For example, if there are three customer and two partner companies, there are six tables including the one for the enterprise employees, as shown in FIG. 3.

The user submission of the initial password is now described.

When a user logs in with his or her userID, BUID and randomTempPasswd, which was sent earlier to the client by the server using triple encryption and subsequently decrypted and entered into the login screen within twenty four hours by the client, the following steps take place.

The entered values traverse over the SSL connection to the server at the hosted site. The entered values are then verified against the entries in the cache in the following manner for three successive tries within five minutes.

The server thread for authentication looks up the corresponding record in the cache using the userID as the index key to the cache table.

Once a userID match is found, a hash is created, i.e. {SHA-256{BUID, (userID+randomTempPasswd)}, using the three received values; userID, BUID and randomTempPasswd.

The hash is verified against the saved credential generated using the same algorithmic steps but with the values previously residing in the server's cache. If this second match is valid, there is a valid temporary password. If the match is not valid, there is a security hack. This is because either the entered userID value is correct but the randomTempPasswd doesn't match, or, the BUID used for login was incorrect. In this case, the password is discarded and authentication failure is reported back to the user with the appropriate error message.

On the other hand, if there is no match for the userID in the cache, and the twenty-four-hour timer hasn't expired, the following situations are possible. There is an unauthorized userID. This means that the user who first asked for a temporary password is not logging in with the earlier entered userID, or it's a miscreant trying, for example, a denial of service attack to learn the responses. Alternatively, the userID in the cache itself is hacked. In this case, a thread to diagnose the cache is fired. This compares against the userIDs from each of the decrypted ciphertexts of the records to find a match. If there is a match, it can be deduced that a manipulation of the clear text userID did happen (a Denial of Service attack, for example); this being an attempt to foil the search for a matching userID in the cache. Also, it is important to note that the persistently saved hashes of the records of entire cache table are useful to quickly verify/confirm if any part of the cache table itself was hacked by comparing individual hashes of the records (as is done by the thread cacheRecordIntegrity Check( ).

If five minutes expire or the three tries of login with the temporary password submission are not successful, the account is locked out, requiring the server administrator's help to unlock the account.

In a further embodiment of the invention, a role-based access using combinatorial inheritance and randomized conjugates in an internet hosted environment is described.

Role-based access control (RBAC) provides a convenient layer of abstraction by describing access control patterns. The number of layers of abstraction needed depends on the tradeoff between granularity of control vs. ease of management. Role checking is done during first login with the userID and business unit ID (BUID). Roles are transparently verified as described below.

Role-based access control is popular in several different types of environments, and standards have been proposed. However, an embodiment of the present invention is directed to specific role-based authentication and authorization with the hosted server's participation in role search and verification. Simply stated, as shown stepwise in FIG. 4, after the userID, password and Business Unit ID (or BUID) are entered during the initial login in step one, the role is checked in step two by the application/web server at the hosted site, before the user is authorized to perform his or her functions.

Figure 4:
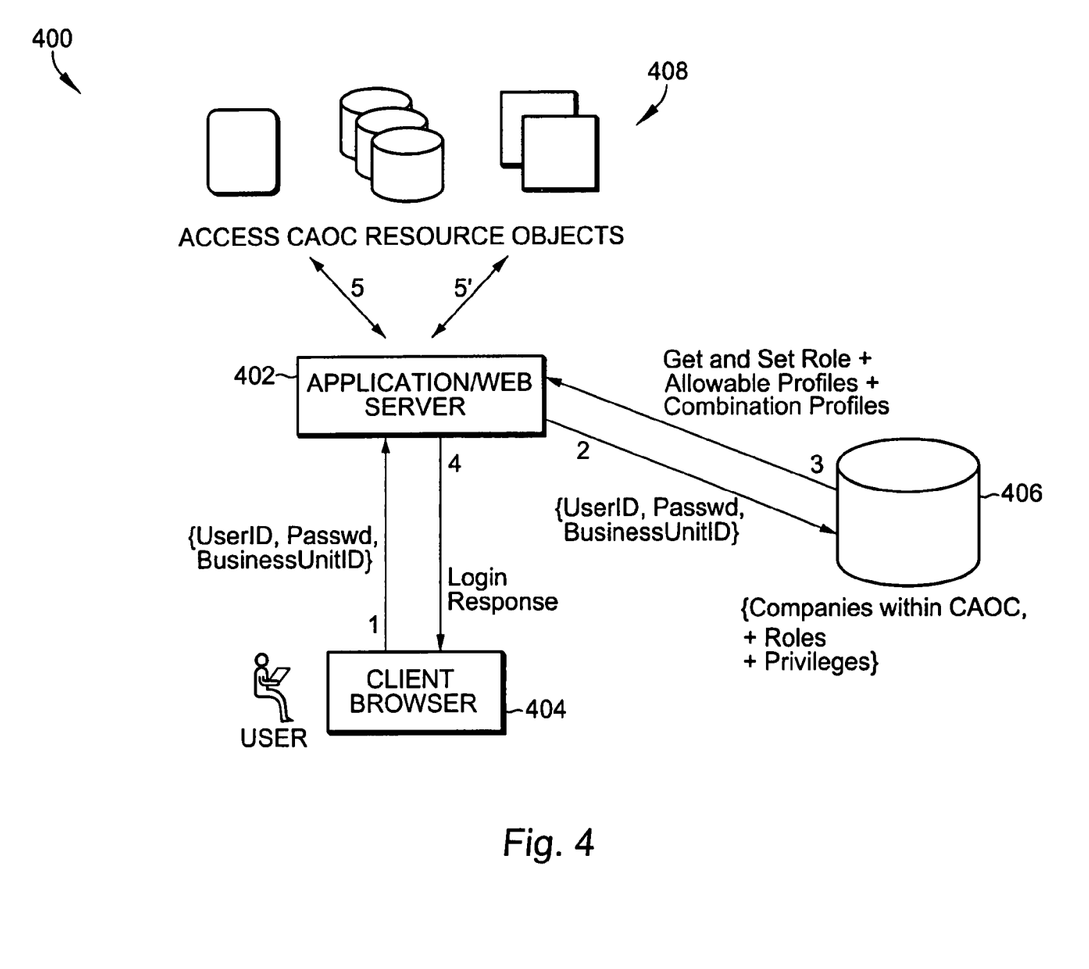
FIG. 4 is an overview of the initial authentication process for a user logging into the application/web server via a client browser in the CAOC with accessed resource objects according to an embodiment of the present invention.

Referring now to FIG. 4, an overview is shown of the initial authentication process 400 for a user logging into the application/web server 402 via his/her client browser 404 in the CAOC with resource objects 408 to access. Database 406 has the userID, Password and Business Unit ID or BUID information, along with the roles and associated privileges for all the companies sharing the resources inside the CAOC; enterprise, partners and customers.

Authentication and authorization is therefore combined in one compact step. Based on the authorization success, user profiles are loaded in memory for the user, as indicated in step three, to perform the necessary functions (assuming that these user profiles were populated earlier by administrators working with the users). Then, users are informed as in step four to access resources (as shown in steps five and five prime).

The role definitions for CAOC access privileges are described below.

It is important to note that roles can be defined hierarchically and the definitions can be constrained in profiles, written in a standardized (and hence portable) notation such as the OASIS' eXtensible Access Control Markup Language, or XACML, for users' profiles. The following are some role assumptions and role examples.

A role can have one or more sub-roles. And, a sub-role can have one or more sub-sub-roles. For example, if a role of Software Engineer is a role that is assigned to a user, it may actually be a branch on a sub-tree of engineer roles.

The branch may actually form a leaf under two conditions that it is a role or its lower denominations such as sub-role or sub-sub-role and so on, and there are no further finer roles (i.e. denominations) along that branch. It constitutes a unique string for the user's company's role hierarchy.

In actuality, role names may be similar between two or more companies, but the role's hierarchical topologies of the sub-trees can be different for the companies operating within the hosted site environment.

Roles are also differentiated by the associated BUID.

The Business Unit ID, i.e. BUID, is represented thus as a randomized conjugated secret:

{<Company_ID_Random_String>|<Company_Division_ID>|<Random_Filler_String>}

Where:

<Company_ID_Random_String> is COID (16 bits)

<Company_Division_ID> is CDID (12 bits)

<Random_Filler_String> is RF (4 bits)

The BUID plays a significant part in making the role unique across the CAOC tenants. The BUID is also used as a key in encryption and hashing schemes. Therefore, the secrecy of the BUID must be protected. So, before delving further on the role definition, an explanation is provided below for its construction.

Company divisional IDs normally don't change and are assumed to be more or less static. While the size of each random string is limited, dictionary attacks are harder since two random strings are included as parts of the BUID.

The BUID is utilized in the user's role definition for uniqueness and as a key in hashing and encryption operations. So, its periodic refreshment in a way represents application of distributed cryptography. Without it, given sufficient time for analysis, an adversary who is able to recover all the distributed BUIDs as "secrets" will be eventually successful in breaking the system.

It is economical to use the BUID as a secret key for every user, otherwise there is additional overhead of administration, storage and computation to maintain separate secret keys for every user. The hosting server needs to have a BUID entity in any event for various user level transactions. So, dual purposes are served with the BUID.

In the BUID string, twenty-eight out of thirty-two characters are random; two strings of sixteen and twelve characters; i.e. COID and CDID. For example, choosing from a set of fifty characters to fill sixteen for the COID (Company ID) string and twelve for the RF (Random Filler) string, a sufficiently large number of possible combinations of BUID for a single set of users from a single tenant company within the CAOC are realized: $\{(50**16)*(50**12)\}$. That is practically large enough to avoid collision attacks given limited time and resources to break.

Of course, given the fixed nature of divisional IDs, those may likely get exposed to miscreants, if not protected by the tenant companies. But, we assume otherwise. Three types of attacks on COIDs and RFs are possible. A simple replacement of one or more of the divisional IDs in the CAOC database along with replacements in their respective databases may be attempted. A modification or corruption and usage of the divisional IDs may be attempted. Finally, deletion or destruction of one or more of the divisional IDs may be attempted.

To protect from the above three scenarios, a mathematical relationship between all the COIDs, and a similar one among all the RFs, is created across the tenant companies. Therefore, if values of COIDs and RFs are derived from two separate secrets for a set of tenant companies, then it is hard to surreptitiously replace or destroy a COID or an RF without being noticed.

If we consider a random function $C_0(x)=a_0+a_1x+ \ldots + a_{m-1}x^{m-1}$

Then, for calculating the company ID, COID, for $(k+1)^{th}$ COID:

$$(COID_i, C_{k+1}(COID_i)) = \{COID_i, C_k(COID_i) + g_k(COID_i)\}$$

where $g_k$ is a random $(m-1)$ degree polynomial with $g_k(0)=S1$, the secret for COIDS.

Similarly, for the $(k+1)^{th}$ random filler string, RF, consider a random function $R_0(x)=a_0+a_1x+ \ldots +a_{m-1}x^{m-1}$; therefore:

$$(RF_i, R_{k+1}(RF_i)) = \{RF_i, R_k(RF_i) + g_k(RF_i)\}$$

where $g_k$ is a random $(m-1)$ degree polynomial with $g_k(0)=S2$, the secret for RFs.

Thus, unless at least $(m-1)$ entities are known for each of the two above, the original two secrets, S1 & S2, for computing the random COIDs and RFs cannot be deciphered. Hence, the secrets can be maintained to validate the BUIDs and its components automatically with a software program on periodic basis (for example, running as a nightly job, if a security policy of the CAOC chooses to do so).

For a time instance, t1, assume a set of COIDs and RFs are generated. Using the above algorithm, at time t1, for company "1" to company "n", there are COIDs and RFs as follows spread across the "n" tenants of the CAOC:

$COID_1(t1), COID_2(t1) \ldots COID_n(t1)$ $RF_1, (t1) RF_2(t1), \ldots Rf_n(t1)$ So, the BUIDs as randomized conjugated secrets for a specific instance t1 is formed as follows:

For company 1:

$COID_1(t1)$|<Company1_Division_ID1>|$RF_1$, (t1)

$COID_1(t1)$|<Company1_Division_ID2>|$RF_1$, (t1) etc.

For company 2:

$COID_2(t1)$|<Company2_Division_ID1>|$RF_2$, (t1)

$COID_2(t1)$|<Company2_Division_ID2>|$RF_2$, (t1) etc.

The role name construction and its definition of "full qualification" using BUID is described, with an arbitrary example.

In one company, a "simple" role of Software Engineer may be part of the Engineer branch, which, in turn, can be part of a main branch called Technical Staff. The Engineer branch could have multiple branches: Hardware Engineer, Firmware Engineer, Network Engineer, and so on. While, in another division or company, Software Engineer may be directly below Technical Staff branch. So, for the first company, the role name string is:

SoftwareEngineer.Engineer.TechnicalStaff.

But, for the second, it will be

SoftwareEngineer.TechnicalStaff.

Across the companies, another differentiator is the BUID. Since, for speed of computation, profiles are loaded in a common database for all the CAOC tenants and the hosting enterprise, individual role name strings are concatenated at the end with its corresponding BUID.

For example, for two firmware engineer sub-roles under an Engineer role from two different companies or divisions are distinctly designated by their fully qualified role name as:

FirmwareEngineer.Engineer.<BUID1> and
FirmwareEngineer.Engineer.<BUID2>.

Note that, as per the definition of the BUID design, the value of the fully qualified strings change for different time instances (depending on the frequency of the BUID regeneration).

A role must be uniquely identified across all users of the participating companies at the hosted site. Roles are also merged or combined as happens in the real world. This is explained in further detail in conjunction with the term "Combinatorial Inheritance".

Every role, whether it is a basic role or a role created by combining different roles, is assigned a randomly generated sixteen-character (128-bit) code, referred from now on as a "roleID". The roleIDs are stored in the roles database once they are generated by the enterprise's CAOC administrator. Although the roleID is generated with the same or some other set of grammar construction rules that is employed for random generation of the user's password, the user's password string is different from that of his or her roleID. So, even with the same fully qualified role name string between two CAOC companies, their assigned roleIDs are different and so their fully qualified role names are also different.

Table 1 below shows the organization of the authorization domains for participants in the CAOC. Per the resource object, such as an application, a storage subsystem, a server or a network, there are allowable access privileges at the highest level of the role hierarchy. Branches, sub-branches and further denominations of the role branches inherit all or part of the roles. Since, realistically, roles are often combined; the concept of combinatorial inheritance of privileges comes into play.

In the Table 1 example, resource objects and their available privileges are presented in the first two columns. Also, in the remaining columns, participating users are assigned the privileges they use as employees of different companies, enterprise, partner or customer.

The following notations are used in Table 1:

TABLE 1

Organization of the Authorization Domains for Available Resource Objects

| Object Name | Privileges | Enterprise Employee | Partner 1 | Partner 2 | Customer 1 | Customer 2 | Customer 3 |
|---|---|---|---|---|---|---|---|
| App1 | R, W, E | * | R | R, W | * | E | E |
|  | SR, SW, SE | * | SR | SR | SR | SR | SR |
| App2 | SW, SR | SR | * | SE | SE | SW | SE |
| Server1 | SW, SE | * | * |  |  |  |  |
| Server2 | R, W, E | R, E | E | E |  | E |  |
| Storage1 | R, W | * | R |  | R | R | * |
| Network1 | R, W, E | E | E |  | E |  |  |
| Network2 | R, W, E | * | R, E | * | R, E | E | E |

R: read, W: write, E: execute, SR: shared read, SW: shared write, SE: shared execute
*: inherit all available privileges
+: combine privileges for joint roles using OR logic In Table 2 below, just one resource object from the above table is entered for multiple roles to show their resultant privileges. Roles are broken down into sub-roles and their further denominations with inherited access rights. Combinatorial inheritance instances are shown with combined roles and their resultant privileges. The sub-roles inherit some or all of the privileges of the (parent) role, so a child (or branch) role cannot have more privileges than the parent.

Refer, for example, to Customer 2 from Table 2 below. AppManager is the parent role for the sub-role NetworkOperator. Hence, the role name string NetworkOperator.AppManager represents the child role of the AppManager role. The fully qualified role name string stored in the roles database is: NetworkOperator.AppManager.<Customer2_User_BUID>. There are multiple BUIDs within a company since part of the BUID string is the user's division. The roles defined for one division of a company may not be valid for another one of the same company.

TABLE 2

Combinatorial Inheritance of Authorization Privileges for a Resource Object

| Resource Object Name | Privileges | Enterprise Employee | Partner 1 | Partner 2 | Customer 1 | Customer 2 | Customer 3 |
|---|---|---|---|---|---|---|---|
| App1 | R, W, E | * | R | R, W | * | R, E | E |
|  |  | Engineer: R, W, E SoftwareEngineer. | AppMon-Analyst: R | Hardware Manager: R, W | Manager: R, W, E ProgramManager. | AppManager: R, E Network- | Production-Manager: E |

TABLE 2-continued

Combinatorial Inheritance of Authorization Privileges for a Resource Object

| Resource Object Name | Privileges | Enterprise Employee | Partner 1 | Partner 2 | Customer 1 | Customer 2 | Customer 3 |
|---|---|---|---|---|---|---|---|
| | | Engineer: R, W, E SoftwareTech-Writer.Software-Engineer.Engineer: R, E Test Engineer: E SysAdmin.Engineer: R, E SysIntegrator.Sysadmin: R, E | | Technician.Hardware-Manager: R | Manager: R ProductManager.Manager: R, E SysManager.Manager: R, W, E SysOperator.SysManager.Manager: E | Operator.AppManager: E | Production-Operator.Production-Manager: E |
| | | SofwareEngineer.Engineer + SysAdmin.Engineer: R, W, E Network Engineer: E | | | ProgramManager.Manager + SysOperator.SysManager.Manager: R, E | | |

As shown in Table 2 above, for an employee of the enterprise, "SofwareEngineer.Engineer+SysAdmin.Engineer" represents the combined role, and so the privileges of the individual (basic) roles are merged with OR logic.

Role setting at initial login and subsequent combinatorials is now described.

During the initial login, a temporary password is made available to the user, sent by the hosting server after the user clicks on the "first time" user button on the login screen. The user enters his or her userID and the temporary password (using a process that involves a triple-encryption step followed by an encryption-and-double-decryption step) along with the BUID. If the user is successfully authenticated, the server loads the corresponding user profile with authorization rules (or privileges, as referred to earlier). If the user's role changes, the CAOC administrator updates the profile, and new authorization rules are downloaded for subsequent logins. Combinatorial inheritance determines the resultant rules when roles are combined or overlap, completely or partially; and the administrator updates the roles data base accordingly. Since each role has a distinct roleID, the combined roleID is created in the following manner:

Concatenate the two or more roleIDs in question and compute a hash.

SHA-256(<roleID1><roleID2> . . . <roleIDn>)

Then, take the first sixteen characters (128 bits) and strip the rest. Since roleID1, roleID2 . . . roleIDn are all unique, the hash of the concatenated string is most likely a unique string across all current and subsequently generated individual or combinatorial roles. The probability of uniqueness failure due to stripping is assumed to be very low as there are not a very large number of combinatorial roles.

The definition for translation of the role profile into CAOC policy rules in XACML is now described.

Multiple role profiles are taken and their privileges integrated into the CAOC environment. While combinatorial inheritance is useful in combining two or more roles into a single new role for a user, multiple such roles may need to interact simultaneously from different companies as tenants in the CAOC. As more and more tenants participate, newer roles are added into the CAOC; thus the complexity of the system grows exponentially. A way to translate the complex CAOC role definitions and inheritance framework into XACML policy framework with certain assumptions is explained below.

The complete policy applicable to a single operational request by an authorized employee of a tenant in the CAOC may in fact be dependent on a number of rules, policies and policy sets including several related policies. It is recommended that policy sets be formed for sets of resources to be accessed independent of the specific CAOC tenants that are involved. What this means is that the focus is on the resource objects and their access privileges (i.e. authorization rules in the context of the XACML policy).

A single rule (represented by a roleID and its privileges) represents a boolean expression, but is not evaluated in isolation because other rules (based on other simultaneous roles in action) come into play. XACML allows users of the standard to define their own combining algorithms. Therefore, in the CAOC context, a combinatorial role represents one such algorithm explained above. The RuleCombiningAttributeId defines the mechanism for combining the role privileges within a policy (or policy set) using combinatorial inheritance.

Thus the following are the assumptions and an explanation of the XACML request context policy showing rules for access to and execution of an Enterprise Resource Planning ("ERP") application (data).

Rule: =Role's privileges (where role could be basic or combinatorial)

RuleId: =roleID in the CAOC environment

Resources: =Disjunctive sequence of Resource elements, combines using the logical AND (not used in this example)

Resource: =Conjunctive sequence of ResourceMatch elements or AnyResource element where the general meaning of resource is data, service or system component (or what is specified in Table 1 and 2 above as "object"—e.g. application, storage subsystem, server)

Condition: =Must evaluate to be true for the Rule (i.e. CAOC Role) to be applicable Target: =describes the decision requests to which this CAOC policy applies; in the example below it is not applying to any specific subjects, and can apply to only specific resources (mentioned in the ResourceMatch fields, if necessary)

Subject: =any actor whose attributes can be referenced by a predicate; the example below references roles (as attributes) of a user (who is an actor); e.g. Software Engineer, System Administrator, etc.

The following XACML code is an example of narrowing the role profile by including it as part of a rule definition that defines the manifestation of any kind of role; for example, a role that is a combination of software engineer and system administrator.

```
<?xml version=1.0" encoding="UTF-8"?>
<PolicySet>
<Policy xmlns="urn:oasis:names:tc"xacml:1.0:policy">
xmlns:xsi="http://www.w3.org/2001/XMLSchema-instance"
xsi:schemaLocation= "urn:oasis:names:tc:xacml:1.0:policy
http://www.oasis-open.org/tc/xacml/1.0/cs-xacml-schema-
policy-01.xsd"
    PolicyId= "identifier:caoc_example:comb_inherit1"
    RuleCombiningAttributeId="identifier:rule-combining-
algorithm:combinatorial-inheritance">
    <Rule
        RuleId="urn:oasis:names:tc:xacml:examples:ruleid:<16-
        character-roleID>"
        Effect="Permit">
    <Description>
        User is a Software Engineer and System
        Administrator.
        S/he may access CAOC resources at the schema
        location on the <URL> for CAOC
        for which s/he is a designated user.
    </description>
    <Target>
        <Subjects>
            <AnySubject/>
        </Subjects>
        <Resources>
            <Resource>
                <Attribute
                AttributeId=
                "urn:oasis:names:tc:xacml:1.0:resource:data"
                    DataType="http://www.w3.org/2001/
                    XMLSchema#anyData">
                    <AttributeValue>/caoc/bestcompany/application/
                ERP/payroll</AttributeValue>
                </Attribute>
            </Resource>
        </Resources>
        <Actions>
            <Action>
                <Attribute
                AttributeId=
                "urn:oasis:names:tc:xacml:1.0:action:action-id"
                    DataType="http://www.w3.org/2001/
                    XMLSchema#binary>
                    <AttributeValue>execute</AttributeValue>
            </Action>
        </Actions>
    </Target>
    </Rule>
    </Policy>
</PolicySet>
```

In a further embodiment of the present invention, methods and an apparatus for persistence of authentication and authorization for a multi-tenant internet hosted site using cookies is described.

Cookies are messages that a web server transmits to a web browser so that the web server can keep track of the user's activity or behavioral preferences on a specific web site. The message that the web server conveys to the browser is in the form of a HyperText Transport Protocol (HTTP) header that consists of a text-only string. The text is sent to the client browser. The browser, in turn, stores cookie information for later reuse.

There are primarily two types of cookies: persistent and non-persistent. Persistent cookies have an expiration date and are stored on a user's hard disk until that date. A persistent cookie can be used to track a user's browsing habits by identifying her whenever she returns to a site. Non-persistent cookies are stored in the web browser's memory. Non-persistent cookies usually last only until the browser is closed and are then destroyed. Because of the stringent privacy requirements in the CAOC environment which can involve applications from different customers, the latter type (non-persistent), and the cookies are stored in the user's (client) browser's in-memory cookie table. Hence, in general, cookie stealing or harvesting by reading or copying cookie files is of significantly lesser probability.

It is well-known that "regular" cookies have no security. Cookies are commonly used to maintain state information between subsequent HTTP requests. State information includes session state, remembering passwords and user names, and personalization and configuration features. A malicious user could hijack applications that do not implement strong session controls. So, several types of mechanisms for secure cookies have evolved over the last several years. The methods and apparatus of the present invention generate a "Secure Cookie Set" on the server side for client session resumption in the multi-tenant CAOC environment as described below.

According to the present invention, the Secure Cookie Set maintains user login persistence while protecting the cookies from known security threats, and therefore the validation of authentication and authorization, when users don't want to re-login (after periods of non-activity during which a user can get logged off automatically due to time out limits). This is useful, for example, in long troubleshooting sessions by a customer, partner or the employees of the enterprise. Further the Secure Cookie Set assures integrity of the cookies with a message integrity check that confirms that no one has modified the cookie after it was created by the user. It further confirms non-repudiation with the help of a user's non-modifiable stamp of ownership and reduces server side checks on roles, sub-roles and their further denominations corresponding to user logins, thus improving hosting server's performance. Lastly, it improves diagnosibility when problems occur pertaining to the user re-login such as cookie or session hijacking.

The pre-conditions for the persistence mechanism are now described. It is important to note the following conditions that are necessary for the persistence mechanism and its deployment. There is minimal trust in the general cookie generation and maintenance and this is addressed by the persistence mechanism of the present invention. Secure cookies will have been set over the HTTPS connection (over the Secure Socket Layer—SSL—protocol) during the previous login unless the client browser preferences have prevented the setting of the cookies. Users are able to authenticate in the later authentication sessions using a cookie created from the last login as long as the cookie set hasn't expired, or the browser hasn't been closed (destroying the server-sent client browser-in-memory cookies). According to the present invention, a cookie has seven fields that are used to create authentication, authorization, integrity, confidentiality, non-repudiation and to aid in diagnosis in situations where one or more of the cookies may have been manipulated or destroyed, either accidentally or intentionally. In the present invention users need special browser software to generate a cookie that contains a timestamp. In addition, it is assumed that the private/public key pair is generated previously by the customer's browser software package and the server has the public key of the customer's client machine. This means there is a set of Certificate Authorities ("CA"), that the server must trust, which distributes the public keys of the user's client machines. Modern browsers such as Mozilla come with a cookie manager that allows flexibility to accept cookies from specific sites, so it is assumed that the hosted site has been included in that list by all the user's browsers. A Business Unit ID or BUID, which is known a priori to the hosting server, is used as the key for encryption and decryption of cookies within the proposed cookie set, except for the BUID cookie itself, which is described below. Using the BUID to encrypt authenticable items saves a step for user as s/he doesn't have to enter personal information such as userID or password to re-login. Secondly, BUIDs are already used and maintained for other functions and are known to server and clients, hence they are also the choice for encryption of cookies that are non-authenticating type (e.g. the last two). Alternatively, if a per-user secret key is used, there are many of them to be tracked and protected. Also, clients would have to be informed of them and there are additional logistics needed for secure transport, storage and usage. Public keys are not appropriate for authentication processes since the mechanisms surrounding them are not inherently private (unless coupled with other secure methods). In summary, having two ways to initially encrypt the cookie set on the server side further improves security. And, avoiding personal information (such as password) to decrypt cookies on the client side for re-login causes considerably less security exposure since password and userID are susceptible to brute-force dictionary attacks. AES (already incorporated into Java 2 SDK, Standard Edition, v1.4 onwards in the JCE, Java Cryptography Extension), Advanced Encryption Standard (FIPS-197) is used as the algorithm for encryption. AES is used in the present invention to encrypt each cookie on the server side. However, mere encryption of the cookie is not enough since encryption only provides confidentiality. It doesn't guarantee authentication, integrity or non-repudiation.

An Internet Cookie Set for login persistence (using a browser memory cache "non-persistent" method) and automated diagnosis is now described.

A "user" is an enterprise employee, partner or customer. Authentication is needed since it is desired that an unauthorized intruder or a login-session-hijacker be prevented from using the established cookies in the client machine's (browser's) cache memory or on the hard disk of the hosting server. Authentication can be based on IP address, password or digital signature based. But, IP address-based authentication has limited use and is not useful when a user is mobile (with a laptop, for example) with dynamic IP assignments by DHCP (Dynamic Host Configuration Protocol). And, passwords, though encrypted or hashed, can be prone to advanced dictionary attacks, as mentioned earlier.

Figure 5:
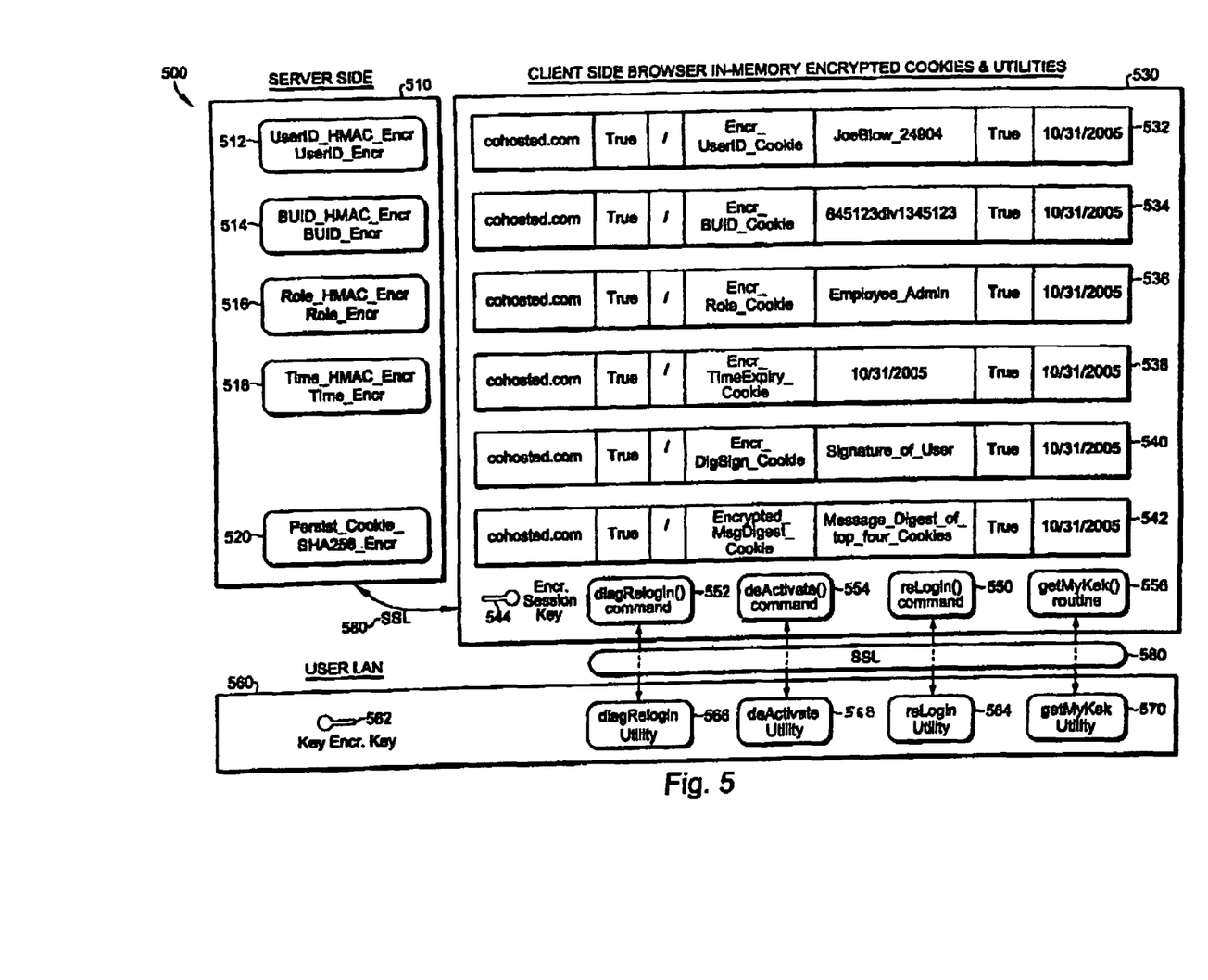
FIG. 5 shows a set of cookies used for login persistence, each having seven fields, used for subsequent logging via SSL over the Internet according to an embodiment of the present invention, and corresponding artifacts on the CAOC server and utilities on the user's LAN server.

FIG. 5 shows the set of cookies 500 sent by the server to the client used for login persistence, each with seven fields, used for subsequent (i.e. non-initial) logging via SSL over the Internet. A client side 530 and a server side 510 are shown. As shown, the client side has six cookies 532, 534, 536, 538, 540, and 542, and the server side has corresponding entities 510 maintained for re-login validation and diagnostic purposes for five of the six cookies. As an example, for the first userID cookie 532 on the client side, there is a UserID_HMAC_Encr and UserID_Encr ciphertext string 512 maintained on the server side 510. Similarly, BUID cookie 534 has a corresponding entity 514 on the server side 510. Role cookie 536 has a corresponding entity 516 on the server side 510. Time expiry cookie 538 has a corresponding entity 518 on the server side 510. Message digest cookie 542 has a corresponding entity 520 on the server side 510. In addition, the user's LAN server 560 has a Key Encrypting Key 562, which is based on the BUID and the client's FQDN (or Fully Qualified Domain Name, as is described below) that is used to encrypt the user's Session Key (SK) 544. Session Key 544 is generated using a random number generator. The SK encrypts the client-based (browser memory) cookie table. The are three user-initiated commands on the client: reLogin( ) 550, diagRelogin( ) 552, and deactivate( ) 554, all of which invoke the getMyKek( ) routine 556. The corresponding utilities on the user's LAN 560 are the reLogin utility 564, the diagRelogin utility 566, the deactivate utility 568, and the getMyKek utility 570. All communication between client and CAOC server, and between client and its user LAN, is via SSL 580.

In the cookie set of the present invention described below, there are primarily four cookies, shown as the "top four" cookies 532, 534, 536, and 538 in FIG. 5, created by the server to be sent to the client over the SSL connection as follows. In FIG. 5, "cohosted.com" is the URL for the example enterprise's hosted site. There are, in addition, two more cookies 540 and 542. FIG. 5 shows all of the six cookies of the present invention as they exist on the client side and they are serially described in further detail below. The seven fields of each cookie are now described. The first field "cohosted.com" is a domain where the cookie is valid; the second field "True" is a flag to indicate whether or not all machines in a given domain can access the cookie information. The third field is a path that validates only pages in the path to read the cookie. The fourth field is the cookie name. The fifth field is the cookie value. The sixth field is a secure flag (i.e. if the cookie is sent in secure mode or not). And, finally, the seventh field is the date of the cookie's expiry.

Each cookie is now described in further detail.

Encr_User_ID_Cookie 532: This cookie contains the user's userID AES encrypted with the user's BUID as the key before the server sends it to the client machine (user) over SSL when it is sequentially double-encrypted as a result of traversing over the SSL session. (For example: encrypted userID—AES {userBUID, UserID}; when sending over SSL—SSLencryptAlgorithm {AES(E) {user BUID, UserID}}.

Encr_BUID_Cookie 534: This cookie is AES-encrypted with the user's client machine's public key, clientPub, before sending over the SSL and contains the BUID. (So, this can be decrypted only with that client machine's private key, clientPriv, as the decryption key.) Having a BUID inside the cookie set confirms the user's membership in a business unit of one of the CAOC tenant companies (including the enterprise). Since the components of the BUID itself are backed by shared secrets, this cookie field is verifiable if there is a need to do so in situations where there is a security compromise or an unintended corruption.

Encr_Role_Cookie 536: This cookie is AES-encrypted with the user's BUID before sending over the SSL and contains the roleID. The roleID, as previously described, represents the user's unique role, simple or combinatorial, and inherently connects to the authorization profile of the user. A unique string of sixteen characters is used to create the roleID, which asserts the authorization privileges of the user who originally created the cookie with a login into the server. The privileges assigned to the role are contained in this cookie. Another employee of the same company with a similar role (but not exactly this one) is not able to take over the secure HTTPS login session because the roleID is unique across all the CAOC tenants and enterprise roles (and userID separates the users from each other). Thus, FIG. 5 covers the specification for the use of the cookies by all users for persistence of authentication and authorization. Since each user uses their own BUIDs and assigned roles (in addition to their user IDs) the user's role print in the role cookie is unique.

Encr_Time_Expiry_Cookie 538: This cookie is AES-encrypted with the user's BUID before the server sends over to the client over SSL and contains the time stamp by the server indicating when the cookie is defined to be 'expired' and hence invalidated for authentication thereafter.

Encr_DigSign_Cookie 540: The user's (client) computer generates a time stamp, timestamp, when it receives the previous 4 cookies from the server, and creates this cookie. The time stamp is signed by the user's private key, clientPriv, in this way:

AES[clientPriv, timeStampCookieString].

This creates a digitally signed cookie 510 as shown in the table 500 of FIG. 5. The encrypted digital signature cookie has the "user's digital signature" (i.e. signed with user's client machine's private key), so this will ensure authentication, time verification (in addition to the Time_Expiry_Cookie), as well as a non-repudiation characteristic for any transaction (on the user's behalf) for the cookie set on behalf of the user. When a user attempts to access the hosted web service, for example, it contacts the web server (that initially set up the earlier login session) which has the user's public key to decrypt the timestamp, when necessary (e.g. for validation purposes at re-login time or diagnostics purposes after the security breach).

Encr_MsgDigest_Cookie 542: The last cookie, the Encrypted Message Digest Cookie, is created by the server by AES encrypting the message digest of the top four cookies combined. For the message digest the server uses Secure Hash Algorithm (SHA-256) with the user's BUID as the key, thus asserting integrity and some confidentiality at the user's company (plus division) level. The two steps for creating the message digest for the combined four cookie strings are as below.

(1) Create a concatenated string of the top four cookies:

combinedTopFourCookieString={cookiestring1|cookie String2|cookieString3|cookieString4}

(2) Next, use SHA-256 algorithm to create the digest using BUID as the key:

messageDigestTopFourCookies=SHA-256(BUID, combinedTopFourCookieString)

The digest is encrypted by user's public key, clientPub.

AES(E){clientPub, messageDigestTopFourCookies}

So, the encrypted digest can only be verified thus by decrypting with the user's private key, clientPriv, by the user on the client side:

AES(D){clientPriv, AES(E){clientPub, messageDigestTopFourCookies}} and, then comparing the previously stored digest with this one.

This prevents any miscreant changing any of the contents of any of the previously generated cookies without being noticed by a monitoring servlet thread of the server before the user's client machine submits the cookies to the server at the hosted site.

When the client remains inactive for fifteen minutes or gives a deActivate( ) command, the authenticated login session with the hosted site's server becomes inactive. On a reLogin( ) command from the user, the internal routine, getMyKek( ), invokes the getMyKek utility on the user's intranet LAN to retrieve a Key Encrypting Key, KEK. KEK is created on the fly (without storing on the client or user LAN server side) using HMAC-hashing user's client machine's fully qualified domain name, clientFQDN, with user's BUID as key as below.

HMAC(BUID, clientFQDN)

The result is used to decrypt the Session Key, SK, that is cached in the client browser as follows.

AES(D){HMAC(BUID, clientFQDN), SK}

The methods and apparatus for cookie usage on the server side is now described according to the present invention.

On the server side, cookies can be secured by a combination of hashing and encryption. Encrypted versions of the top four cookies are maintained on hard disk for comparison at the time of submission when a user reenters the previously authenticated session. The encryption of each cookie is done using the server's public key, serverPub:

AES(E){serverPub, anyCookieString}

So, when needed, only the server can decrypt the string with its private key, serverPriv.

If an HMAC (FIPS-198), or Key-Hashed Message Authentication Code is added to every cookie string, the privacy is also complemented by integrity and diagnosibility since HMACs from both sides can be compared when the cookies are submitted for resuming the login session. HMAC is created using a key which is the BUID of the user for whom the cookie is created. Next, the server encrypts the hash with server's public key, serverPub, so now the hashes can only be verified by using the server's private key, serverPriv, (for decryption of the hash) at the time the remote user attempts to resume the session by submitting its cookies.

According to the present invention, the steps for server generated top 4 cookies (per session) are as follows: The server sends an AES-encrypted cookie (using appropriate encryption keys as described above) over the SSL under the standard Internet HTTPS protocol; another server servlet thread generates a hash of the cookie with the user's BUID as a key:

HMAC(BUID, anyCookieString);

Next, the server encrypts the hash using the server's public key for future usage:

AES(E){serverPub, HMAC(BUID, anyCookieString)};

Then, the server AES-encrypts the hash with the user's public key, clientPub, to send to the client:

AES(E){clientPub, HMAC{BUID, anyCookieString}};

Then, the server sends the encrypted hash created by concatenating the top 4 cookie strings hashed to the user over SSL.

AES(E){clientPub, messageDigestTopFourCookies}

The methods and apparatus for cookie usage on the client side according to the present invention is now described.

Re-logging into the session will happen by user's reLogin( ) command initiated by the user. At this time, the following steps take place:

First, the getMyKek( ) routine is invoked from the user's LAN that retrieves the Key Encrypting Key (KEK) to decrypt the Session Key from the client cache.

In turn, the Session Key decrypts the client-cached cookie table.

Next, the reLogin( ) command extracts the top four cookies from the cached cookie table.

These 4 cookies are sent to the CAOC hosting server over SSL for re-login.

The client side can perform the following when re-login fails:

Decrypt the currently-used first four cookies (one-by-one) by AES-decrypting using the appropriate decrypting key (decryptKey), user's BUID for the three of the top four keys or clientPriv key for the encrypted BUID key:

AES (D){decryptKey, encryptedCookieString}

Create a new hash of the currently used top 4 cookie using BUID:

HMAC(BUID, messageDigestTopFourCookies);

The user can then decrypt the server's earlier sent encrypted message with the user's private key "clientPriv":

AES(D){clientPriv, {clientPub{HMAC(BUID, anyCookieString)}};

The original hash of the cookie string sent by the server is now available. Compare this hash to the hash that was created on the client side (using the currently used top four cookies).

Once it is determined that the message digest of the top four cookies shows a variance, a software thread invoking diagReLogin( ) utility fires off comparisons on the server side to determine the foul cookie since the individual cookie HMACs are maintained on the server. Then further actions can be taken to isolate the source of error based on the discovery as to which specific cookie was compromised and the damage caused by the compromise.

The diagnosis can take place in the following manner ("Server" mentioned below is the CAOC hosting server unless specifically called out as the "user's intranet or LAN server"):

(1) Client: Invoke diagRelogin( ) utility from user's intranet (user LAN) by executing a command on the client.
<user>diagRelogin<return>

(2) Client: The diagRelogin( ) in turn invokes getMyKek( ) over SSL from user's intranet (i.e. enterprise's, partner's or customer's LAN) to retrieve the Key Encrypting Key (Kek) to perform decryption of the session key.

(3) Client: The control returns to diagRelogin( ). The Session Key decrypts the memory-cached cookie table.
AES(D){sessionKey, encryptedMemCacheCookieTable}

(4) Client: Next, diagLogin( ) extracts and sends the top 4 current cookies used by the client and encrypts them individually on the client side using server's public key.
AES(E){serverPriv(D){AES(E){serverPub, anyCookieString}}

(5) Client: diagLogin( ) send all four encrypted cookies to the server over SSL.

(6) Server: Decrypts each of the top 4 sent cookies.
AES(D){serverPriv(D){AES(E){serverPub, anyCookieString}}

(7) Server: Creates a hash of the top 4 cookies using user's BUID as the key.
HMAC(BUID, messageDigestTopFourCookies (8) Server: Compare this digest with the one saved earlier to confirm client's claim of the compromise.

(9) Server: Once confirmed, server will decrypt each of the 4 cookies sent by the client in step 1 using server's private key.

(10) Server: The server's servlet thread decrypts the earlier saved cookies (on the server) using server's private key, serverPriv.

AES(D){serverPriv,AES(E){serverPriv(D){AES(E){serverPub, anyCookieString}}

(11) Server: The server servlet thread will next compare each of the decrypted cookies in step 10 with the corresponding one decrypted in step 9.

(12) Server: The servlet thread determines the foul cookie.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

I claim:

1. A method for providing a temporary password in an internet hosted environment comprising:

providing a central user password database including at least one temporary password that is associated with a user, the at least one password being randomly generated and not being known to the user;

receiving a temporary password request from a client machine of the user at a hosted server, the temporary password request including a user ID ("userID") and a business unit ID ("BUID");

extracting the temporary password from the central user password database, the extracting step including using the userID as a key and verifying that the BUID in the temporary password request matches a BUID associated with the temporary password in the central user password database;

triply-sequenced encrypting of the temporary password at the hosted server of the internet hosted environment, the triply-sequenced encrypting including:

encrypting the user's client machine's domain name using the BUID as a key which results in a "string X";

encrypting the temporary password using string X as a key which results in a "string Y";

encrypting string Y using a public key of the user as the key which results in a "string Z"; and transporting string Z to a client side of the internet hosted environment.

2. The method of claim 1 further comprising encrypting and doubly-sequenced decrypting by the client machine to use the temporary password on the client side; the encrypting and doubly-sequenced decrypting comprising:

encrypting the user's client machine's domain name using the BUID as a key which results in string X;

decrypting string Z using a private key of the user as a key which results in string Y; and decrypting string Y using string X as a key which results in the temporary password.

3. The method of claim 2 further comprising performing an initial login, the performing step comprising:
  entering by the user of the userID, the temporary password and the BUID into the internet hosted environment.

4. The method of claim 3, further comprising after the entering step, prompting the user to enter a desired password for subsequent logins.

5. The method of claim 1 further comprising after the encrypting string Y step:
  beginning a time period within which the user can perform an initial login with the temporary password; and
  storing the temporary password in a temporary password cache table.

6. The method of claim 5 in which the temporary password cache table comprises an index, a credential, and an encrypted record and a tenant's table with records that are individually hashed and encrypted.

7. The method of claim 1, wherein the at least one temporary password does not include a time expiry.

8. A method for use in remote services authentication in an internet hosted environment comprising:
  accepting a login from a user at a hosted server with a combination of a user ID ("userID") of the user, a business unit ID ("BUID") of the user, and a random temporary password of the user which was sent earlier to the user using triple encryption and which was subsequently decrypted and entered into a login screen with a predetermined period, the triple encryption including:
    encrypting the user's client machine's domain name using the BUID as a key which results in a "string X";
    encrypting the temporary password using string X as a key which results in a "string Y"; and
    encrypting string Y using a public key of the user as the key which results in a "string Z"; and
  looking up a record in a cache using the userID as an index key to a cache table; each record in the cache table including:
    a user ID ("userID"); and
    a credential comprising a hash of the userID and a temporary password.

9. The method of claim 8, wherein the predetermined time period is equal to twenty-four hours.

10. The method of claim 8 further comprising in the looking up step,
  creating a hash of the user's userID and temporary password together, using the users BUID as a key, responsive to a record being found having a userID matching the users userID.

11. The method of claim 10 further comprising verifying the hash of the users userID and the temporary password together using the users BUID as a key against the credential in the record being found having a userID matching the users userID.

12. The method of claim 11 further comprising validating the temporary password if the hash of the users userID and the temporary password together using the user's BUID as a key is the same as the credential in the record being found having a userID matching the users userID.

13. The method of claim 12, further comprising after the temporary password has been validated, prompting the user to enter a desired password for subsequent logins.

14. The method of claim 11 further comprising discarding the temporary password and reporting an authentication failure if the hash of the users userID and the temporary password together using the users BUID as a key is not the same as the credential in the record being found having a userID matching the users userID.

15. The method in claim 11 further comprising diagnosing a failure in finding a matching userID.

16. The method of claim 15 further comprising traversing persistently-saved decrypted message digests to find a matching userID.

17. The method of claim 8, wherein the cache table further includes an encrypted record comprising an encrypted version of the temporary password.

18. A method for providing a temporary password in an internet hosted environment, the method comprising:
  encrypting a temporary password at a hosted server of the internet hosted environment, the encrypting including:
    encrypting a client machine domain name of a user using a business unit ID ("BUID") of the user as a key which results in a "string X";
    encrypting the temporary password suing string X as a key which results in a "string Y";
    encrypting string Y using a public key of the user as the key which results in a "string Z"; and
  transporting string X to a client side of the internet hosted environment; and
  obtaining the temporary password by the client side; wherein the obtaining step includes:
    encrypting the client machine domain name using the BUID as a key which results in string X;
    decrypting string Z using a private key of the user as a key which results in string Y; and
    decrypting string Y using string X as a key which results in the temporary password.

19. The method of claim 18, further comprising performing an initial login, the performing step comprising entering by the user of the userID, the temporary password and the BUID into the internet hosted environment.

* * * * *